June 4, 1968     D. W. LITFIN     3,386,328
NAIL HAVING HEAD TO RECEIVE CORD OR THE LIKE
Filed March 11, 1966
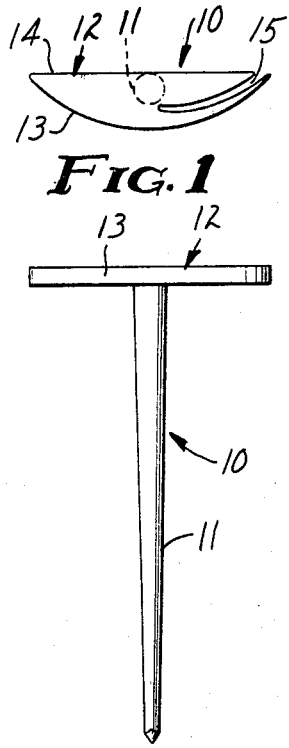
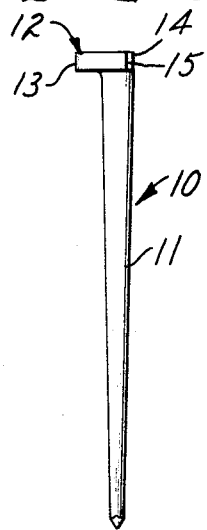
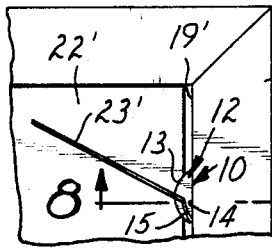
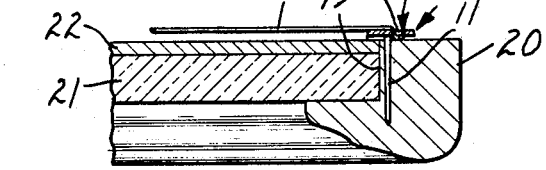
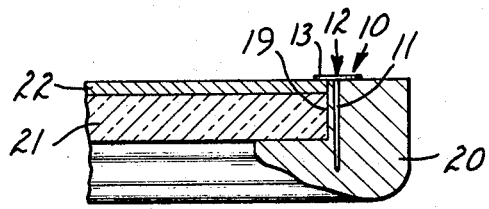
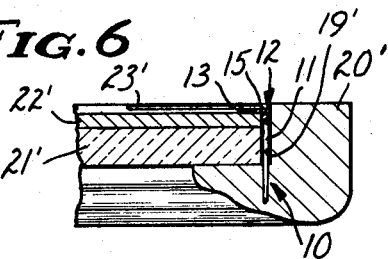
INVENTOR.
DOROTHY W. LITFIN
BY Merchant & Gould
ATTORNEYS United States Patent Office 3,386,328
Patented June 4, 1968

3,386,328
NAIL HAVING HEAD TO RECEIVE
CORD OR THE LIKE
Dorothy W. Litfin, Rte. 1, Walnut Grove, Minn. 56180
Filed Mar. 11, 1966, Ser. No. 533,494
2 Claims. (Cl. 85—28)

ABSTRACT OF THE DISCLOSURE

A nail having a head with one arcuate edge and a second edge forming a chord of the arcuate edge with a slot through the head having the opening in the second edge and terminating adjacent the body of the nail. The slot is adapted to receive a cord or the like for hanging frames, etc. and the nail is positioned with the second edge abutting a vertical surface so the slot is closed to prevent the cord from being released therefrom.

---

This invention pertains to a nail for attaching a cord or the like to an object such as a picture frame and for simultaneously aiding to assemble said object and includes an elongated tapered shank having a head at one end thereof with a first arcuate edge and a second edge forming a chord of the first arcuate edge and with a slot through the head opening at the second edge and terminating adjacent the junction of the head and the shank.

In attaching cords, wires, etc. to objects such as picture frames and the like, it is generally necessary to attach a member which protrudes from the object, such as a nail, screw eye, etc. In addition, other nails or similar devices must be utilized to secure the glass and/or picture in the frame. These protruding devices prevent the frame or other object from hanging parallel to a wall or the like, are ugly and unsightly if exposed to view in the slightest, and in many instances mar the walls, etc.

The present device is a nail which is utilized to assemble such objects as glass and/or pictures in frames as well as providing means for conveniently attaching a cord or the like thereto. The present nail connects the cord to a picture frame or the like quickly and conveniently without leaving unsightly protrusions or ends hanging therefrom and securely locks the cord therein so there is no danger of the cord becoming disengaged from the nail. In addition, the novel construction of the nail holds the assembly more securely in place with less relative movement therebetween.

It is an object of the present invention to provide a new and improved nail.

It is a further object of the present invention to provide a nail which may be utilized for assembling and hanging objects.

It is a further object of the present invention to provide a nail having means for attaching a cord thereto which means securely locks the cord in place when the nail is currectly positioned in the assembly.

These and other objects of this invention will become apparent to those skilled in the art upon consideration of the accompanying specification, claims, and drawings.

Referring to the drawings, wherein like characters indicate like parts throughout the figures:

FIG. 1 is a view in top plan of the present nail;
FIG. 2 is a front elevational view of the present nail;
FIG. 3 is a side elevational view of the present nail;
FIG. 4 is a view in top plan of the present nail illustrating one manner of utilizing the nail in assembly and having a cord attached thereto;
FIG. 5 is a cross-sectional view as seen from the line 5—5 in FIG. 4;
FIG. 6 is a view similar to FIG. 5 illustrating the nail without a cord attached thereto;
FIG. 7 is a view in top plan of the present nail being utilized in another possible manner for assembly purposes, with a cord attached thereto; and
FIG. 8 is a cross-sectional view as seen from the line 8—8 in FIG. 7.

In the figures the numeral 10 generally designates a nail having a shank 11, which may be circular in cross-section or any other desired geometrical shape. Shank 11 tapers longitudinally to a point at one end and terminates in a substantially flat head generally designated 12 at the other end. The head 12 has a first arcuate shaped edge 13 and a second edge 14 which forms a cord of the arcuate edge 13. As illustrated in FIGS. 1 and 3 the second edge 14 lies in a plane substantially tangent to the shank 11. It should be understood that those skilled in the art might develop other geometric configurations for the head 12 which will still come within the scope of this invention. As will be seen when the operation, or use, of the nail 10 is fully disclosed, other geometric configurations might be, for example rectangular or triangular with one edge in a plane substantially tangent to the shank 11.

An arcuate shaped slot 15 in the head 12 opens, or begins, at the edge 14 adjacent the right hand corner thereof and extends arcuately inwardly to a point adjacent the junction of the head 12 with the shank 11. The slot 15 may taper slightly from its open end to its closed end so as to more securely affix the cord therein. However, in many instances such a taper may not be desirable and it should be understood that it is not a necessary part of this invention.

One possible manner of utilizing the nail 10 is illustrated in FIGS. 4 and 5 wherein a groove 19 in a frame 20 has a glass 21 and a picture 22 contained therein in the conventional manner. The nail 10 is affixed in the frame 20 so that a portion of the head 12 extends out over the groove 19 in the frame 20 and over the glass 21 and the picture 22. A cord 23 is engaged in the slot 15 in the head 12 and prevented from sliding therethrough by means of a knot or the like at the extreme end thereof. The nail 10 is pounded firmly into the frame 20 and the cord 23 is secured thereto while the nail 10 simultaneously holds the glass 21 and the picture 22 in the frame 20. This manner of utilizing the nail 10 is especially effective when the combined width of the glass 21 and the picture 22 are approximately equal to the depth of the groove 19, whereby the rear surfaces of the picture 22 and the frame 20 are approximately flush.

In FIG. 6 the nail 10 is utilized to hold the glass 21 and the picture 22 securely positioned in the frame 20. In this case the nail 10 is simply utilized for assembly purposes and no cord is attached thereto. It should be noted that the novel construction of the nail 10 renders the present nail mort adaptable to uses, such as those disclosed above, since the head 12 projects a greater distance to either side of the shank 11 than the head of a conventional nail.

In a third possible manner of utilizing the present nail 10 illustrated in FIGS. 7 and 8, the nail 10 is driven into the groove 19' in a frame 20' alongside of a glass 21' and a picture 22' so that the straight edge 14 of the head 12 is parallel and in abutting relationship with the inner edge of the frame 20' while a portion of the arcuate edge 13 of the head 12 overlaps the picture 22'. This manner of utilizing the nail 10 is preferred when the combined thickness of the glass 21' and the picture 22' is somewhat less than the depth of the groove 19' in the frame 20'.

In some instances the horizontal dimensions of the glass 21' and the picture 22' are less than those of the groove 19' in the frame 20' so that there is sufficient space therebetween to allow the insertion of a plurality of nails 10 therearound. However, in some instances the glass 21' and the picture 22' may fit tightly into the groove 19' in the frame 20' and the nail 10 must be driven into the frame 20' at a slight angle to the edge of of the glass 21' to avoid the breaking thereof. In either case the nail 10 should be driven into the frame 20' so that the straight edge 14 is parallel to and in abutment with the inner edge of the frame 20'.

In this manner a cord 23', having a knot or the like in the extreme end thereof, may be engaged in the slot 15 and securely locked therein when the nail 10 is pounded into the desired position. It will be seen that the open end of the slot 15 is closed by the frame 20' when the nail 10 is in the position set forth above. Thus, the cord 23' cannot slip out of the slot 15 and is securely locked therein. Also, it should be noted that in this particular manner of use all portions of the nail 10, including the head 12, lie below the rear surface of the frame 20' and no portion thereof protrudes outwardly therefrom. Thus, the glass 21' and the picture 22' are secured in the frame 20' while a cord 23' is fixedly attached thereto in a manner to produce no unsightly protrusions.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. A nail for attaching a cord or the like to an object and for simultaneously aiding to assemble said object comprising an elongated shank tapering to a point at one end and having a head at the other end formed as an integral part thereof with one edge of said head being somewhat arcuate and a second edge forming a cord of said first arcuate edge, said head having a cord receiving slot therethrough lying in the plane of said head and extending from said second edge to substantially the junction of said head and said shank.

2. A nail substantially as set forth in claim 1 wherein the head is substantially flat with said second edge lying in a plane substantially tangent to the shank and the cord receiving slot is somewhat arcuate with the open end thereof lying in the second edge and the closed end of the slot lying adjacent the junction of the head and the shank.

References Cited

UNITED STATES PATENTS 339,006   3/1886   Newman _____ 85—10

FOREIGN PATENTS 129,475   4/1902   Germany.

EDWARD C. ALLEN, *Primary Examiner.*

CARL W. TOMLIN, *Examiner.*

R. S. BRITTS, *Assistant Examiner.*